US010675628B2

(12) United States Patent
Olivier et al.

(10) Patent No.: US 10,675,628 B2
(45) Date of Patent: Jun. 9, 2020

(54) FLUID TRANSFER DEVICE AND PROCESS OF ASEPTICALLY TRANSFERRING A FLUID

(71) Applicant: MERCK PATENT GMBH, Darmstadt (DE)

(72) Inventors: Stephane Olivier, Rosheim (FR); Luc Felden, Andolsheim (FR); Didier Metz, Stotzheim (FR)

(73) Assignee: MERCK PATENT GMBH, Darmstadt (DE)

( * ) Notice: Subject to any disclaimer, the term of this patent is extended or adjusted under 35 U.S.C. 154(b) by 310 days.

(21) Appl. No.: 15/301,207

(22) PCT Filed: Mar. 9, 2015

(86) PCT No.: PCT/EP2015/000524
§ 371 (c)(1),
(2) Date: Sep. 30, 2016

(87) PCT Pub. No.: WO2015/149908
PCT Pub. Date: Oct. 8, 2015

(65) Prior Publication Data

US 2017/0021355 A1 Jan. 26, 2017

(30) Foreign Application Priority Data

Apr. 2, 2014 (EP) .................................... 14290093

(51) Int. Cl.
*B01L 3/00* (2006.01)
*G01N 1/38* (2006.01)

(52) U.S. Cl.
CPC ................ *B01L 3/563* (2013.01); *G01N 1/38* (2013.01); *B01L 2200/141* (2013.01);
(Continued)

(58) Field of Classification Search
CPC ......... B01L 2200/141; B01L 2300/044; B01L 2300/0672; B01L 2300/0681;
(Continued)

(56) References Cited

U.S. PATENT DOCUMENTS 2,584,397 A * 2/1952 Pitman .................. A61J 1/2089
141/329
3,282,306 A * 11/1966 Greenhut .................. B65B 3/14
118/421
(Continued)

FOREIGN PATENT DOCUMENTS

EP 0771184 B1 9/2002
EP 1284160 A2 2/2003
(Continued)

OTHER PUBLICATIONS

International Search Report for PCT/EP2015/000524 dated Jun. 9, 2015.

(Continued)

*Primary Examiner* — Mary E McManmon
*Assistant Examiner* — James R Hakomaki
(74) *Attorney, Agent, or Firm* — Millen, White, Zelano & Branigan, PC; Ryan Pool

(57) ABSTRACT

A fluid transfer device comprising a first reservoir (1) having a predetermined sub-ambient pressure and volume and a presealed opening (1*a*), a second reservoir (2) containing a predetermined volume of a fluid (M) and having a presealed opening (2*a*), and a chamber (3) having an internal space (6) and an inlet (4) to the space (6) adapted to be connected to the opening (2*a*) of the second reservoir (2) and an outlet (5) from the space (6) adapted to be connected to the opening (1*a*) of the first reservoir (1).

18 Claims, 7 Drawing Sheets

24
23
7
3
6

(52) U.S. Cl.
CPC . *B01L 2300/044* (2013.01); *B01L 2300/0672* (2013.01); *B01L 2300/0681* (2013.01); *B01L 2300/123* (2013.01); *B01L 2400/049* (2013.01); *G01N 2001/382* (2013.01)

(58) Field of Classification Search
CPC ......... B01L 2300/123; B01L 2400/049; G01N 1/38; G01N 2001/382
USPC .......................................................... 141/329
See application file for complete search history.

(56) References Cited

U.S. PATENT DOCUMENTS 3,306,563 A * 2/1967 Soto .......................... A61J 1/20 141/319
3,494,351 A * 2/1970 Horn ................ A61B 5/150213 600/575
3,566,930 A * 3/1971 Kirschner ................. A61L 2/00 141/244
3,872,867 A * 3/1975 Killinger ............... A61J 1/2089 141/329
4,300,404 A * 11/1981 Mehl .................... A61B 10/007 73/863.52
5,176,673 A * 1/1993 Marrucchi ............ A61M 39/18 604/29
5,329,976 A * 7/1994 Haber .................. A61J 1/2089 141/18
5,853,034 A * 12/1998 Edwards .............. B67D 1/0015 141/330
6,021,824 A * 2/2000 Larsen .................. A61J 1/2089 141/329
6,135,172 A * 10/2000 Fere ...................... A61M 5/162 141/130
6,196,281 B1 * 3/2001 Schwallie .............. B65D 47/10 141/311 R
6,599,273 B1 7/2003 Lopez
6,623,455 B2 * 9/2003 Small ...................... A61J 3/002 141/18
6,689,108 B2 * 2/2004 Lavi ........................ A61M 5/19 604/131
6,706,440 B1 * 3/2004 Takimoto .............. H01M 2/361 141/241
6,776,059 B2 8/2004 Kunimune et al.
6,921,395 B2 7/2005 Carano et al.
8,667,996 B2 * 3/2014 Gonnelli ............... A61J 1/2089 141/322
2002/0004643 A1 * 1/2002 Carmel ................. A61J 1/2089 604/86
2003/0036742 A1 2/2003 Carano et al.
2003/0100863 A1 * 5/2003 Shekalim ............ A61M 5/1454 604/141
2003/0164051 A1 9/2003 Kunimune et al.
2004/0002684 A1 1/2004 Lopez
2006/0200093 A1 9/2006 Lopez
2006/0206060 A1 9/2006 Lopez
2006/0229572 A1 10/2006 Lopez
2007/0186992 A1 * 8/2007 Bullen .................... B65B 3/003 141/65
2010/0137830 A1 * 6/2010 Glejbol ................. A61M 5/148 604/506
2010/0310426 A1 * 12/2010 Campbell ............... B01L 3/563 422/516
2011/0108158 A1 * 5/2011 Huwiler ............ A61M 5/14244 141/2
2011/0132490 A1 * 6/2011 Kuhni ....................... A61J 1/20 141/7
2012/0089088 A1 * 4/2012 Foshee .................. A61J 1/2089 604/85
2013/0046720 A1 * 2/2013 Chellappan .............. G06N 5/02 706/47
2015/0029816 A1 * 1/2015 Beyer ....................... A61J 1/20 366/167.1
2015/0153257 A1 6/2015 Olivier et al.

FOREIGN PATENT DOCUMENTS

JP 2008175608 A 7/2008
WO 2014005669 A1 1/2014

OTHER PUBLICATIONS

Search report/Office Action in corresponding JP 2016-564035 dated Feb. 5, 2019 (1 page).

* cited by examiner

FLUID TRANSFER DEVICE AND PROCESS OF ASEPTICALLY TRANSFERRING A FLUID

This invention concerns a fluid transfer device for aseptically transferring a fluid, i.e. a liquid or a gas, especially in the field of sample preparation in the biopharmaceutical, the hospital, food and beverage industries, but also for diagnostic, health care and research uses. The invention also concerns a process of aseptically transferring a fluid using such a transfer device.

A typical prior art device for aseptically transferring liquid in the form of blood is disclosed in U.S. Pat. No. 3,366,103 B. This document discloses a blood-collecting assembly including a cylindrical, air-evacuated container with sub-ambient pressure provided at one end with a re-sealable penetrable stopper, and a holder of a substantially elongated cylindrical configuration including an internal bore that is proportioned and constructed to facilitate the entry therein of the container and stopper and that holds a double-ended needle secured to a restricted forward end of the holder with its inner penetrating end disposed inwardly of the bore of the cylindrical holder and its outer-penetrating end free to pierce the skin of a patient from which blood is to be collected. The air-evacuated container, once pierced by the inner-penetrating end of the double-ended needle will effect, due to its sub-ambient internal pressure, that blood is transferred through the needle into the container. This device is designed for the specific purpose of collecting blood from a living body and cannot be universally used as a fluid transfer device in the sample preparation in laboratory environments, or the like.

It is the object of the present invention to provide a fluid transfer device and a process of aseptically transferring a fluid that can be more universally used in connection with sample processing in laboratory environments, or the like.

According to the invention, there is provided a fluid transfer device as follows: (One embodiment is a fluid transfer device comprising

- a first reservoir (1) having a predetermined sub-ambient pressure and volume and a presealed opening (1_a_),
- a second reservoir (2) containing a predetermined volume of a fluid (M) and having a presealed opening (2_a_), and
- a chamber (3) having an internal space (6) and an inlet (4) to the space (6) adapted to be connected to the opening (2_a_) of the second reservoir (2) and an outlet (5) from the space (6) adapted to be connected to the opening (1_a_) of the first reservoir (1)).

Preferred embodiments of the fluid transfer device are as follows: (Another embodiment optionally includes wherein the volume of the fluid (M) contained in the second reservoir (2) is predetermined such that it is larger than the volume of the internal space (6) of the chamber (3).

Another embodiment optionally includes wherein the second reservoir (2) is deformable under ambient pressure when the pressure in the internal volume is at a sub-ambient pressure.

Another embodiment optionally includes wherein the second reservoir (2) is rigid and contains a piston adapted to move under ambient pressure when the pressure in the internal volume is at a sub-ambient pressure.

Another embodiment optionally includes wherein the second reservoir (2) is rigid and at ambient pressure or pressurized.

Another embodiment optionally includes wherein the first and second reservoirs (1,2) are connected to each other such that the respective openings (1_a_,2_a_) are oriented to be simultaneously connectable to the inlet (4) and outlet (5) of the chamber (3).

Another embodiment optionally includes wherein the chamber (3) is rigid or partially rigid and has at least one wall formed from a flexible material.

Another embodiment optionally includes wherein the flexible material is a porous membrane, preferably supported by a porous material.

Another embodiment optionally includes a second chamber integrated with the chamber (3) or sealingly connectable to the chamber (3) such that its internal space is separated from the internal space of the chamber (3) with the porous membrane interposed as a permeable interface, wherein the second chamber has at least one further inlet and/or outlet to the internal space.)

The invention also provides a process of aseptically transferring a fluid as follows: (A process of aseptically transferring a fluid comprising:

- providing a fluid transfer device as defined above;
- connecting the first reservoir (1) to the outlet (5) of the chamber (3) and opening the presealed opening (1_a_) to extract a part of any fluid contained in the internal space (6) of the chamber (3) into the first reservoir (1) by means of the sub-ambient pressure in the first reservoir (1);
- connecting the second reservoir (2) to the inlet (4) of the chamber (3) and opening the presealed opening (2_a_) to extract at least a part of the fluid (M) contained in the second reservoir (2) into the internal space (6) of the chamber (3) by means of the sub-ambient pressure in the first reservoir (1);
- disconnecting the first and second reservoirs (1,2) from the chamber (3)).

Another embodiment optionally includes wherein the first and second reservoirs (1,2) are releasably connected to each other by an adapter (9).

Another embodiment optionally includes wherein the presealed openings (1_a_,2_a_) of the first and second reservoir (1,2) can be forcibly opened upon connection with the inlet (4) and outlet (5) of the chamber (3), preferably in that the seals (1_b_,2_b_) are pierced by a needle-like extension of the inlet (4) and outlet (5) of the chamber (3).

Another embodiment optionally includes wherein the needle-like extension of the inlet (4) and outlet (5) is removable.

Another embodiment optionally includes wherein the seals (1_b_,2_b_) of the openings (1_a_,2_a_) of the first and second reservoir (1,2) have a self-resealing property.

Another embodiment optionally includes wherein the first and second reservoirs (1,2) are arranged such that, upon connection with the inlet (4) and outlet (5) of the chamber (3), the opening (1_a_) of the first reservoir (1) is opened before the opening (2_a_) of the second reservoir (2) is opened.

Another embodiment optionally includes wherein the internal space (6) of the chamber (3) includes one or more corrugated channel(s) (10) or a maze or a plurality of channels arranged for a simultaneous flow and connected to an inlet header and an outlet header respectively communicating with the inlet (4) and the outlet (5) of the chamber (3). Another embodiment optionally includes wherein the plural channels of the internal space are of substantially equal length or are designed for substantially equal throughput volume.

Another embodiment optionally includes wherein the channel or plural channels is/are arranged so as to substantially cover an internal surface of the chamber (3). Another embodiment optionally includes wherein the inlet (4) and outlet (5) of the chamber (3) are sealed by a sterile filter barrier or a pierceable opening, preferably a septum.

The invention accordingly provides a fluid transfer device comprising a first reservoir having a predetermined sub-ambient pressure and volume and a pre-sealed opening, a second reservoir containing a pre-determined volume of a fluid and having a pre-sealed opening, and a chamber having an internal space and an inlet to the space adapted to be connected to the opening of the second reservoir and an outlet from the space adapted to be connected to the opening of the first reservoir. The volume of the fluid contained in the second reservoir is preferably predetermined such that it is larger than the volume of the internal space of the chamber.

The fluid transfer device of the invention allows aseptic purging of the space in the chamber and expelling of any residual fluids in that chamber by means of the sub-ambient pressure in the first reservoir, which reservoir also takes up the purged fluid and any air bubbles from the chamber. Simultaneously or with a slight temporal delay, the fluid in the second reservoir is transferred to and fills the internal space of the chamber in the same process due to the sub-ambient pressure in the first reservoir communicating with the volume of the second reservoir through the internal space of the chamber without the need of any external hardware or manual activity for effecting the transfer of the fluid. Once activated by connecting the first and second reservoirs to the chamber the fluid transfer device of the invention is autonomously operating to effect the steps of purging the chamber and transferring the prepared fluid to the chamber in pre-defined amounts.

Since the number of elements in the device is low and the structure is simple, the elements can be made from plastics or other disposable materials at low cost. Further, the first and second reservoirs can be easily replaced to effect multiple transfer processes of fluid into the internal space of the chamber and out of that space with repeatable high accuracy. At all times, the fluid does not leak to the outside and the internal space of the chamber or the environment would not be contaminated. Accordingly, the drainage of any fluid from the chamber and the transfer of fluid into the chamber as a replacement can be carried out in a closed system. This includes the efficient and complete removal of any air bubbles from the internal space of the chamber once the first reservoir having the predetermined sub-ambient pressure is connected to the outlet. Any waste of the transfer process is automatically collected in the first reservoir and can be discarded without risk of spill or leaking out of the device or contamination of any users.

Further, the definition of the volumes of the first reservoir and of the second reservoir, of the volume of the fluid in the second reservoir and its relation to the volume of the internal space of the chamber secures reproducible volume transfer independent from user manipulation.

Whereas the first reservoir is sufficiently rigid to withstand the ambient pressure despite of the reduced internal pressure, the second reservoir is preferably deformable under ambient pressure when the pressure in the internal volume is at a reduced sub-ambient pressure during fluid transfer. Alternatively the second reservoir is rigid and contains a piston adapted to move under ambient pressure when the pressure in the internal volume is at a sub-ambient pressure during fluid transfer.

In a further alternative embodiment, the second reservoir is rigid, pressurized or at ambient pressure, and partially filled with liquid in a ratio which allows the air expansion and liquid transfer when connected to a sub-ambient pressure.

The first and second reservoirs can be two separate parts which are used sequentially, or can be connected to each other.

In a preferred embodiment, the first and second reservoirs are connected to each other such that the respective openings of the reservoirs are oriented to be simultaneously connectable to the inlet and outlet of the chamber. This feature even further facilitates the handling of the fluid transfer device in that the connection of first both reservoirs to the chamber can be effected by a single operation of connecting the joined reservoirs to the respective openings.

In a preferred embodiment of the structure where the first and second reservoirs are connected, these reservoirs are arranged such that, upon connection with an inlet and outlet of the chamber, the opening of the first reservoir is opened shortly before the opening of the second reservoir is opened. This time-sequential opening of the pre-sealed openings of the first and second reservoirs defines a distinct sequence of first extracting any fluid from the internal space of the chamber before the fluid is supplemented from the second reservoir. This solution can be achieved by a simple structural adaption in that the connecting points between the inlet and outlet and the pre-sealed openings of the respective reservoirs are displaced in the insertion direction so that the fluid connection is established in time-sequential manner during the connection process.

Preferably, the first and second reservoirs are releasably connected to each other by an adapter. This embodiment is particularly advantageous in that the first and second reservoirs can be made from standard vessels or vials used in the industry and pre-combined in the adapter so as to be specifically adapted to a particular transfer process in terms of pressure level and volume of the reservoirs and fluid to be transferred. The use of an adapter allows the possibility of having a standardized interface or socket for the adapter while being able to use different reservoirs inside the adapter. The use of an adapter furthermore reduces waste amounts since the adapter can be reused. Further, the releasable connection in the form of the adapter allows the simultaneous and simple separation of the reservoirs from the chamber after the fluid transfer.

The pre-sealed openings of the first and second reservoirs are preferably designed such that they can be forcibly opened upon connection with the inlet and outlet of the chamber, preferably in that the seals of the pre-sealed openings are pierced by a needle-like extension of the inlet and outlet of the chamber. Also preferably, the seals of the openings of the first and second reservoirs have a self-resealing property. These aspects even further facilitate the handling of the reservoirs and of the fluid transfer device in that the establishing of the fluid connection can be effected easily by a simple handling and insertion process in only one direction without requiring any further or external tools or devices. The self-re-sealing property avoids spilling of fluids so that transfer is completed when the reservoirs are removed from the connections with the chamber.

The internal space of the chamber preferably includes one or more corrugated channel(s) or a maze or a plurality of channels arranged for a simultaneous flow and connected to an inlet header and an outlet header respectively communicating with the inlet and the outlet of the chamber. This structure improves the efficiency and avoids any liquid mixing in the channel as the flow direction is clearly defined from the inlet to the outlet. Further, an efficient and equal distribution of the fluid in the chamber is facilitated.

Preferably, the plural channels of the internal space are of substantially equal length or are designed for substantially equal throughput volume. This aspect further promotes the effect of the efficient fluid transfer and avoiding of unintended liquid mixing. It considerably reduces the time for effecting the fluid transfer from the second reservoir to the first reservoir, thereby being able to efficiently exploit the sub-ambient pressure level in the first reservoir. The channel or plural channels is/are preferably arranged so as to substantially cover at least one internal surface of the chamber.

Preferably the chamber is completely rigid but it may also be partially rigid and can have at least one wall or surface formed from a flexible material. The flexible material can be plastic or rubber or the like. In a preferred embodiment the flexible material is a porous membrane, preferably supported by a porous material like a drainage frit, a fritted material, a nonwoven fibre stack material, a monofilament woven mesh material or the like. With respect to this embodiment a further preferred structure is that the fluid transfer device comprises a second chamber integrated with the first chamber or sealingly connectable to the first chamber such that its internal space is separated from the internal space of the first chamber with the porous membrane interposed as a permeable interface. A supporting mesh can be set between the membrane and channels. The second chamber preferably has at least one further inlet and/or outlet to it's internal space. With this structure the two chambers can be provided adjacent to each other so that a desired fluid can be filtered from one chamber through the porous membrane to the second chamber. This device can be for example used in a sample preparation process that includes the steps of filtering a liquid sample through the membrane between the adjacent chambers, filtering a rinsing fluid in order to rinse all the internal space above and under the membrane, removing all the liquid above the membrane by air pressurization in the space above the membrane, connecting the first and second reservoirs to create the sub-ambient pressure in the space below the membrane in order to purge the drain below the membrane into the first reservoir and transfer the liquid media from the second reservoir into the drain, and disconnecting the first and second reservoirs and optionally closing the inlet/outlet with plugs.

In a preferred embodiment, the inlet and/or outlet of the chamber are sealed by a sterile filter barrier. This aspect secures sterility of the internal space of the chamber once the first and second reservoirs are removed from the respective connections.

In an alternative embodiment the needle-like extensions of the inlet and/or outlet of the chamber are removable. In such embodiment the inlet and/or outlet of the chamber are each sealed by a piercable opening, having preferably a self-re-sealing property, e.g. by a septum. The connection between the inlet and outlet of the chamber with the first and second reservoir is then enabled via separate needles which pierce the inlet and the outlet openings as well as the openings of the first and second reservoir. Preferably, the needles are connected by a connecting part, forming one single piece ("needle protector"), enabling easy simultaneous handling of both needles. These aspects further facilitate the handling of the device in that after transfer of the fluid and removal of the reservoirs the needles can also easily be removed from the chamber by simply disconnecting the needle-connecting part. The inlet and outlet may then be closed by plugs, or preferably, if the opening has a self-re-sealing property, the inlet and outlet re-seal automatically without any further necessary manipulation. The self-re-sealing property of the inlet and outlet opening of the chamber avoids spilling of fluids and guarantees sterility. This embodiment is further advantageous in that the removal of the needles allows for safer handling of the chamber in subsequent manipulating steps avoiding injury of any user.

The chamber may preferably have a further inlet to the internal space adapted to be connected to an external fluid source. This further inlet can serve to load the internal space of the chamber with a fluid in any processes before the first and second reservoirs are connected to transfer the predetermined fluid from the second reservoir to the internal space of the chamber.

A process of aseptically transferring a fluid using the fluid transfer device of the invention comprises connecting the first reservoir to the outlet of the chamber and opening the pre-sealed opening to extract a part of any fluid contained in the internal space of the chamber into the first reservoir by means of the sub-ambient pressure in the first reservoir, and connecting the second reservoir to the inlet of the chamber and opening the pre-sealed opening to extract at least a part of the fluid contained in the second reservoir into the internal space of the chamber by means of the sub-ambient pressure in the first reservoir. Then, the first and second reservoirs are disconnected from the chamber leaving the transferred fluid in the internal space of the chamber and the initial fluid and air taken out from the internal space in the first reservoir. As described above, the connection of the first and second reservoirs to the outlet and inlet of the chamber can be effected in a time-sequential manner.

BRIEF DESCRIPTION OF THE FIGURES

The invention will be described on the basis of a number of embodiments using the attached drawing as a reference. In this drawing.

Figure 1:
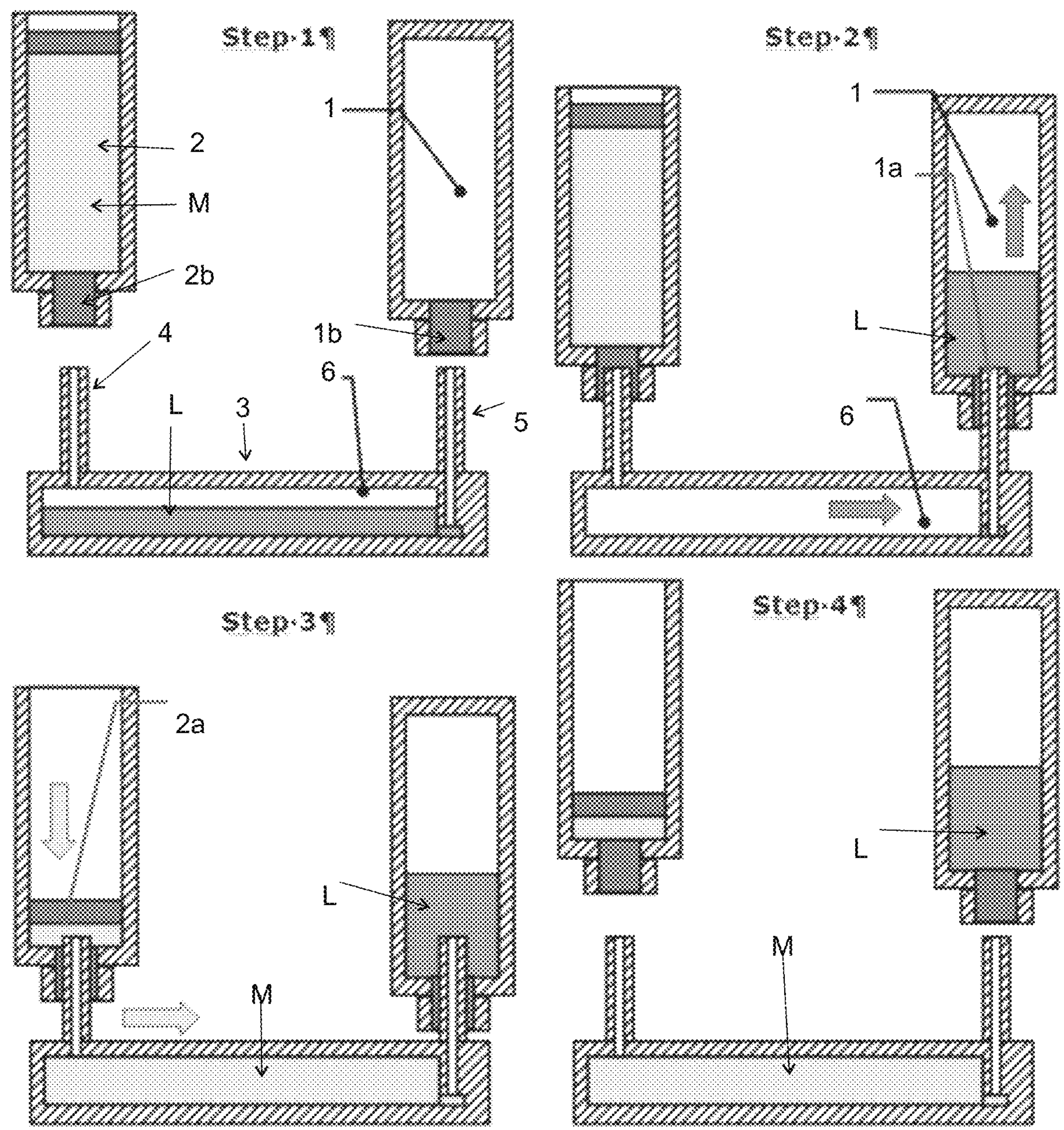
FIG. 1 shows a schematic representation of the fluid transfer device of the invention and the typical stages of effecting the fluid transfer using the device.

The fluid transfer device of the invention as schematically shown in FIG. 1 has a first reservoir 1 that holds a predetermined sub-ambient pressure or vacuum and a volume and is closed by a pre-sealed opening 1*a*. A second reservoir 2 contains a predetermined volume of a fluid M serving as a media to be transferred and also is sealed by a pre-sealed opening 2*a*. The first reservoir is sufficiently rigid to withstand the ambient pressure despite of the reduced internal pressure and it is preferably a glass or rigid plastic vial. The second reservoir 2*c* is preferably deformable under ambient pressure when the pressure in the internal volume is at a reduced sub-ambient pressure during fluid transfer. Alternatively the second reservoir 2 is rigid and contains a piston that closes an open end and is adapted to move under ambient pressure towards the pre-sealed opening 2*a* when the pressure in the internal volume is at a sub-ambient pressure during fluid transfer. Still further, a vent with a filter could be provided to allow extraction of the fluid from the reservoir.

Still further the second reservoir can be rigid, slightly pressurized or not, with a ratio liquid volume/air volume allowing the air expansion to assure partial or complete liquid transfer.

A chamber 3 of the device has an internal space 6 and an inlet 4 to the space 6 adapted to be connected to the opening 2*a* of the second reservoir 2. It also has an outlet 5 from the space 6 adapted to be connected to the opening 1*a* of the first reservoir 1.

Prior to connecting the first and second reservoirs, the internal space 6 of the chamber 3 contains a liquid L and potentially air bubbles. On connection of the first reservoir 1 in a first step, the sub-ambient pressure in the first reservoir effects a transfer of the liquid L and of any air bubbles through the outlet 5 into the first reservoir 1. On connection of the second reservoir 2, preferably with a certain time delay after connection of the first reservoir, the remaining sub-ambient pressure in the first reservoir 1 effects the transfer of the fluid M contained in the second reservoir into the internal space of the chamber until the internal space is completely filled. Some of the fluid M may be discharged into the first reservoir and the volume of the fluid contained in the second reservoir is in any case predetermined such that it is larger than the volume of the internal space of the chamber in order to secure a complete filling of the internal space without any bubbles and a complete purging of the internal space from the liquid initially in that space. Once the fluid transfer is completed, both reservoirs are disconnected from the inlet and outlet of the chamber. The inlet and outlet then may be closed by plugs.

Figure 11:
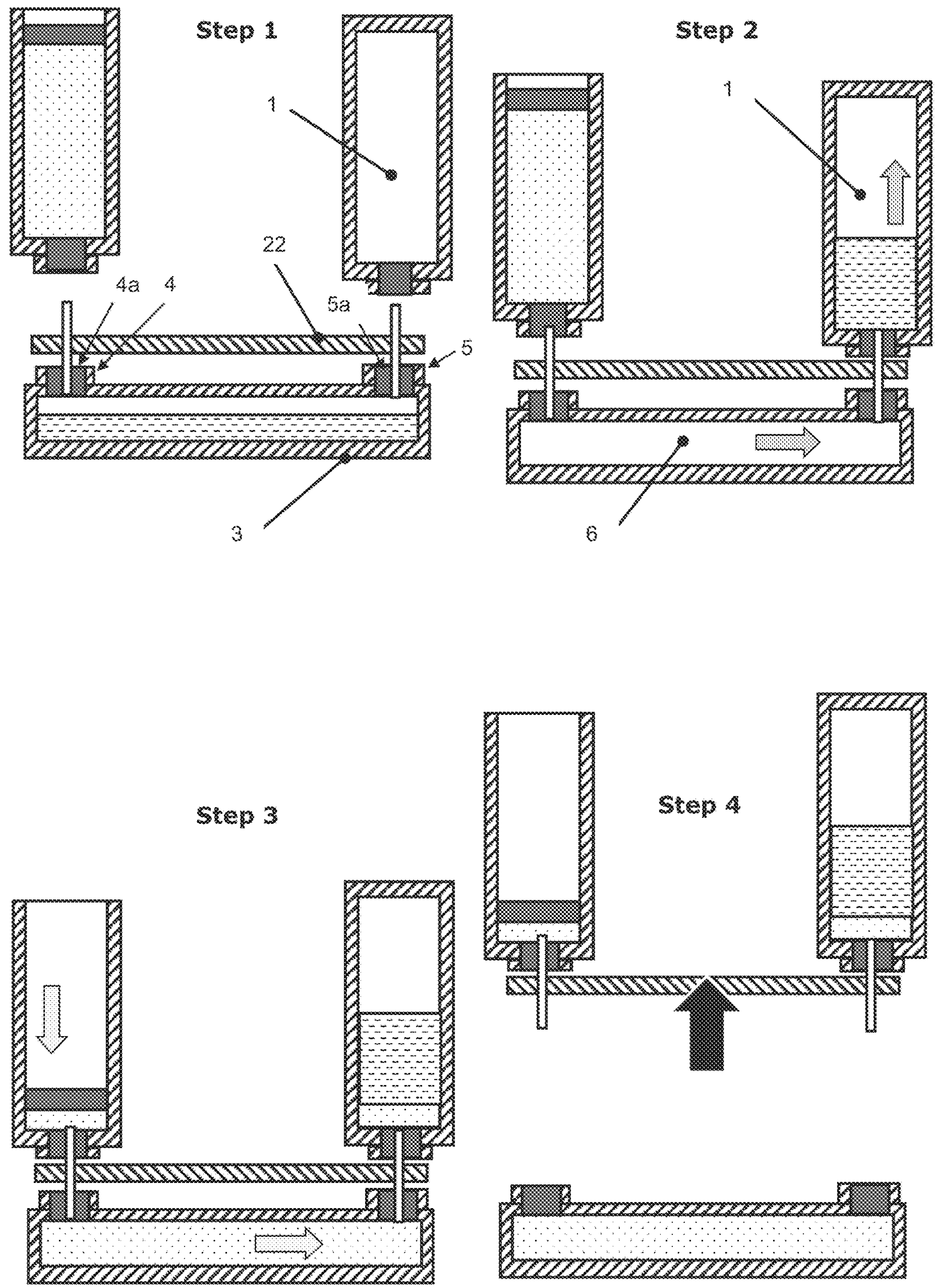
FIG. 11 shows a schematic representation of the fluid transfer device of the invention and the typical stages of effecting the fluid transfer using the device wherein the needle-like extensions are removable from the chamber.

FIG. 11 shows schematically a preferred embodiment of the fluid transfer device of the invention: The principle workflow is the same as shown in FIG. 1. In this embodiment, the inlet 4 and the outlet 5 of the chamber 3 are each sealed by a piercable opening 4*a* and 5*a*, preferably by a material with a self-re-sealing property, e.g. by a septum.

Prior to connecting the first and second reservoirs, the piercable openings 4*a* and 5*a* of the inlet 4 and outlet 5 are pierced by needles 23 and 24, which are preferably connected by a connecting part 22, forming one single piece ("needle protector"). After execution of steps 1 to 3 as described above, both reservoirs and the needle protector are disconnected from the inlet and outlet of the chamber, preferably in one single manipulation. The inlet and outlet may then be closed by plugs, or preferably, if a self-re-sealing material is used for the openings, re-seal automatically without any further necessary manipulation.

Figure 2:
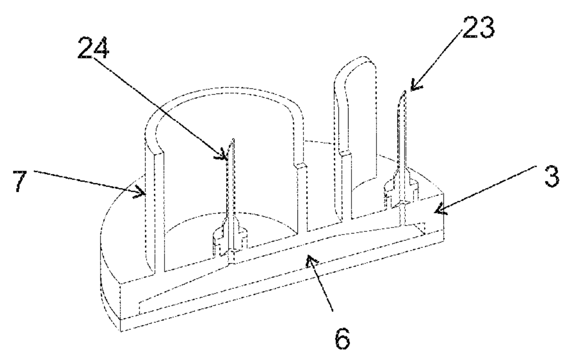
FIG. 2 shows an embodiment of the fluid transfer device where the first and second reservoirs are connected by an adapter.
Figure 3:
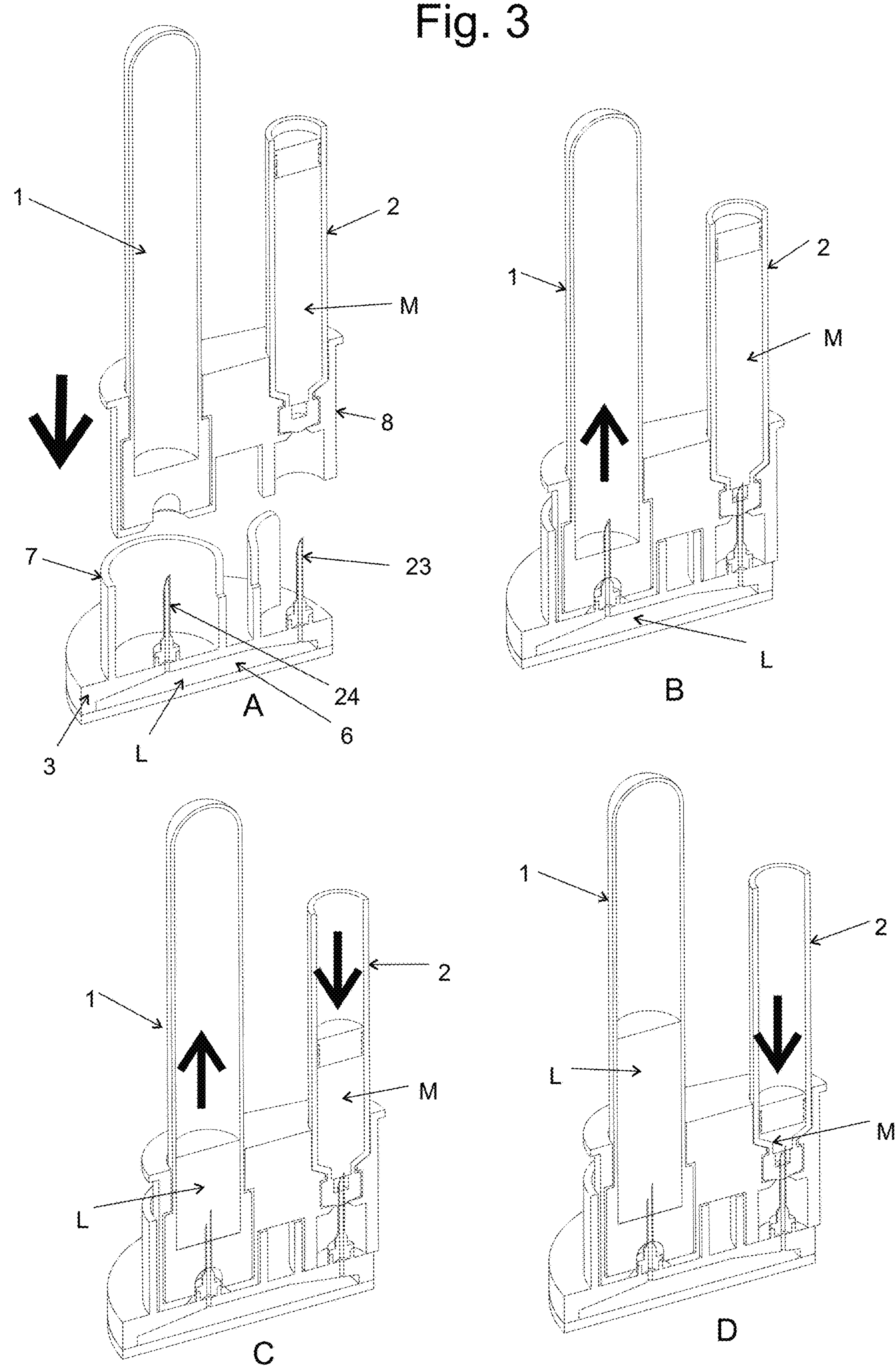
FIG. 3 shows the typical steps corresponding to those of FIG. 1 when the embodiment of FIG. 2 including the adapter is used.

The chamber 3 as shown in FIG. 2 is preferably formed with a receptacle 7 adapted to receive a specific adapter 8 connecting the first and second reservoirs in a predefined manner. The preferably needle-like extensions 23 and 24 of the inlet and outlet 4, 5 to the internal space of the chamber are surrounded by a wall of the receptacle in order to avoid injury of any user. The receptacle 7 guides the adapter 8 towards the inlet and outlet. The pre-sealed openings of the first and second reservoirs firmly held in the holder are oriented such that the single insertion process effects the time-delayed connection of the first and second reservoirs as described above. For this purpose the position of the pre-sealed openings of the reservoirs in an insertion direction is different or the thickness of the seals 1*b*, 2*b* is different or the lengths of the inlet and outlet 4, 5 can be different or these measures can be jointly applied so that the delayed connection is created during the insertion process. Otherwise, the transfer of waste liquid from the internal space 6 of the chamber 3 into the first reservoir and the filling of the internal space of the chamber with the medium from the second reservoir is the same as described above in connection with FIG. 1. FIG. 3 shows the corresponding typical steps of the process of fluid transfer using the device of FIG. 2 including the adapter.

Figure 9:
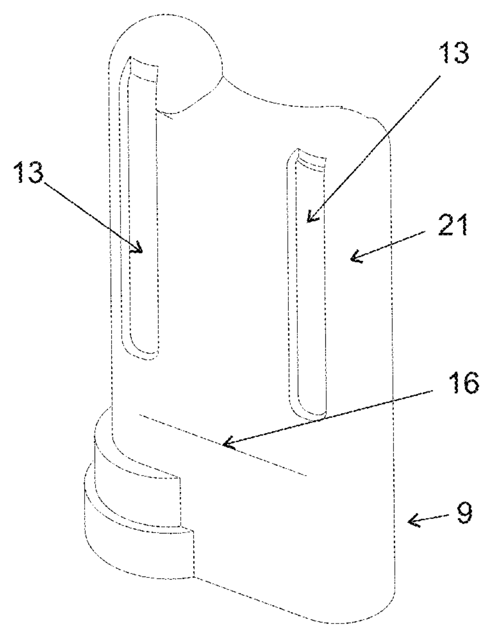
FIG. 9 shows a specific embodiment of an adapter used with the fluid transfer device of the invention.
Figure 10:
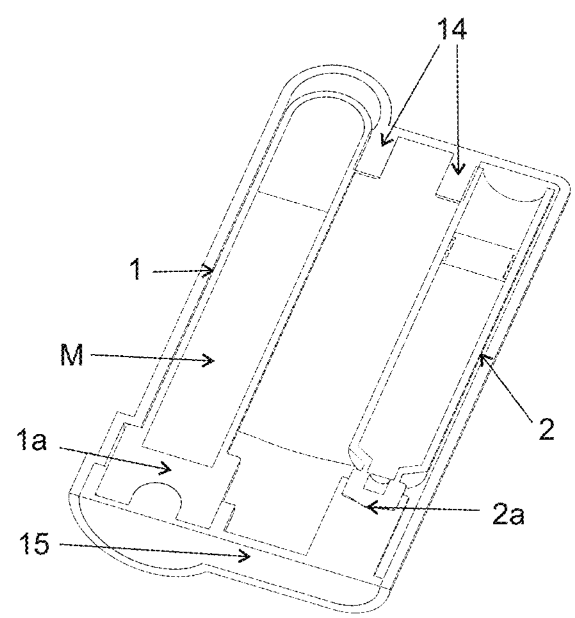
FIG. 10 discloses a cross-sectional perspective view of the adapter of FIG. 9.

A preferred alternative embodiment of an adapter 9 is shown in FIGS. 9 and 10. The adapter includes a casing with internal features for removably holding vials of a predetermined volume or size. Standard 6 ml vacuettes can be used but different standard containers can be used as well depending on the desired purpose and vacuum capacity. The casing contains transparent windows 13 allowing the user to see the internal volume of the reservoirs in the adapter and to observe and inspect the process of the fluid transfer in that the moving piston of the second reservoir is used as an indication of the fluid transfer progress.

The casing can be made from two or more shells that can be opened or closed and can remain attached by living hinges or the like, in order to keep the elements together and provide a defined opening and closing process. The outside of the casing can be provided with features 16 defining a predetermined holding position and guiding the manual force applied by the fingers of a user during insertion into the receptacle. Optionally, a further rubber seal 15 may be provided to close the opening of the adapter at which the pre-sealed openings of the individual reservoirs in the adapter would be otherwise accessible in order to protect them during handling and transport. The rubber seal 15 may be removed before use or may be omitted if not required.

The internal space of the casing 21 of the adapter may be designed so as to hold different volumes and/or different types of reservoirs so that the position of the pre-sealed openings of the respective reservoirs is always at a defined identical position independent from the volume and type. Various ribs or protrusions 14 and the like can be provided to hold the vials or containers in place in defined positions.

Figure 4:
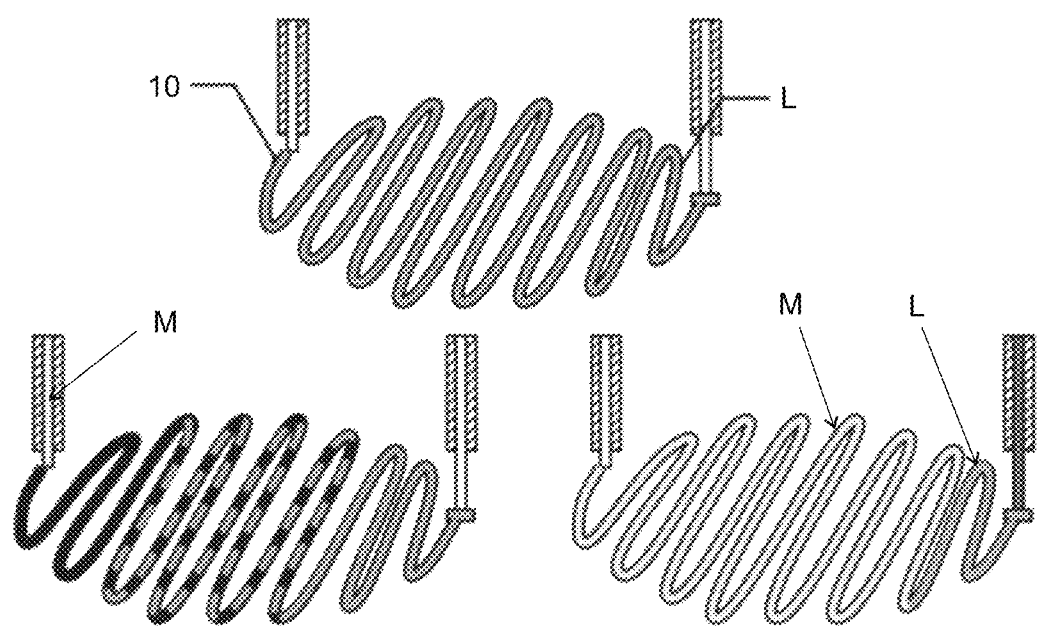
FIG. 4 discloses a schematic representation of a structure where the internal space of the chamber includes a corrugated channel.
Figure 5A:
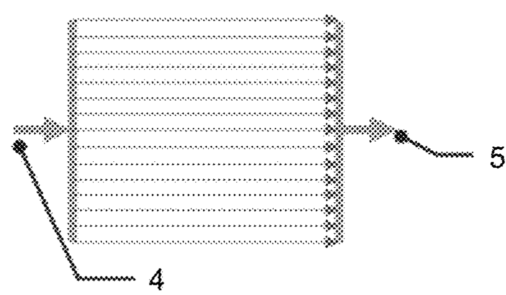
FIGS. 5A to C show three exemplary variations of arranging plural channels in the internal space of the chamber.
Figure 5B:
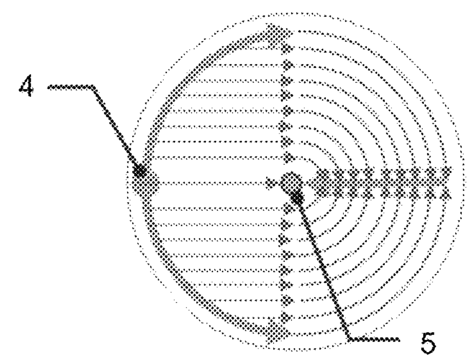
Figure 5C:
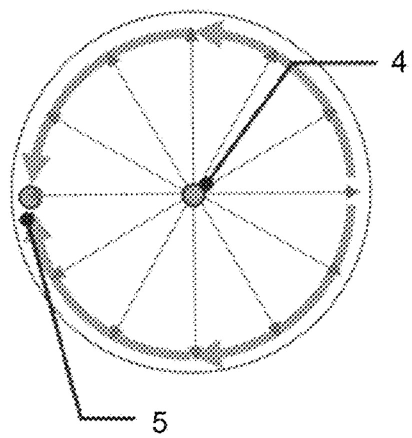

To maximize the efficiency of the bubble removal, the internal space 6 of the device chamber 3 may be provided with one or more corrugated channels 10 as schematically shown in FIG. 4. The corrugated channel connects the inlet to the outlet and secures that all of the fluid contained in the internal space is expelled towards the first reservoir once the connection is made and that the complete internal space is filled by the fluid from the second reservoir without any air bubbles remaining or introduced into the internal space. The channel may alternatively be arranged in the form of a maze or a plurality of parallel channels can be provided with relatively equal length connected to a main inlet channel or header and a main outlet channel or header, respectively, in order to more efficiently purge and fill the internal space of the chamber. FIGS. 5A to C show various arrangements of a plurality of channels providing a simultaneous flow from the inlet to the outlet of the device. FIG. 5C, for example, shows radial channels with a central feeding point at the inlet and circular collecting channels at the periphery leading towards the outlet 5. The one channel or the plural channels is/are preferably arranged so as to substantially cover at least one complete internal surface of the chamber.

Figure 6:
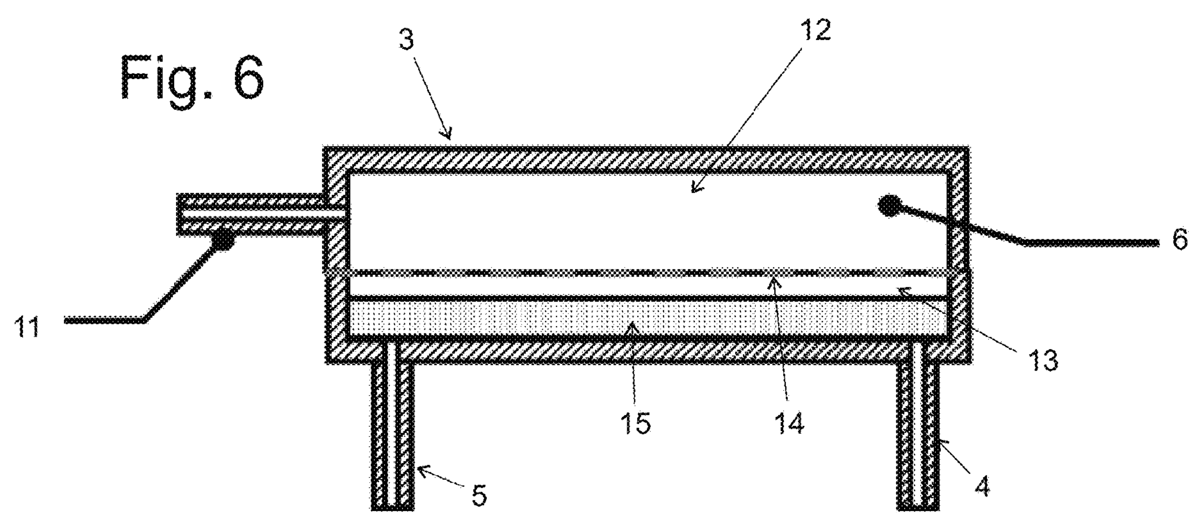
FIG. 6 shows a variation of the fluid transfer device where the chamber has an additional inlet.

In a preferred embodiment shown in FIG. 6, the internal space of the chamber 3 is be sub-divided by a membrane 14 layed on a porous supporting structure 13, separating the internal space into an upstream part of the space communicating with a further inlet 11 and a downstream part of the space communicating with the inlet and outlet described above for purging and filling of the internal space via the first and second reservoirs. The separate inlet 11 (and optionally a further outlet that is not shown) can be used to filter a liquid sample through the membrane 14 in the internal space of the chamber. It also can be used to filter a rinsing fluid in a subsequent process in order to rinse out the cavity above and under the membrane. In the posture shown in FIG. 6 all the liquid above the membrane 14 then can be removed, for example, by air pressurization in the upper cavity through the inlet 11. In a further step, the first and second reservoirs of the transfer device can be connected to the inlet 4 and the outlet 5 to purge the internal space in the channels 10 and the porous structure 13 below the membrane 14 and transfer the liquid media from the second reservoir to the internal space 10 and 13 by the sub-ambient pressure in the first reservoir as described above. Lastly, the first and second reservoirs are disconnected from the inlet and outlet 4, 5 and the inlet and outlet are closed with plugs. The separate inlet 11 (and any separate outlet of provided) is closed by a plug before the fluid transfer.

Figure 7:
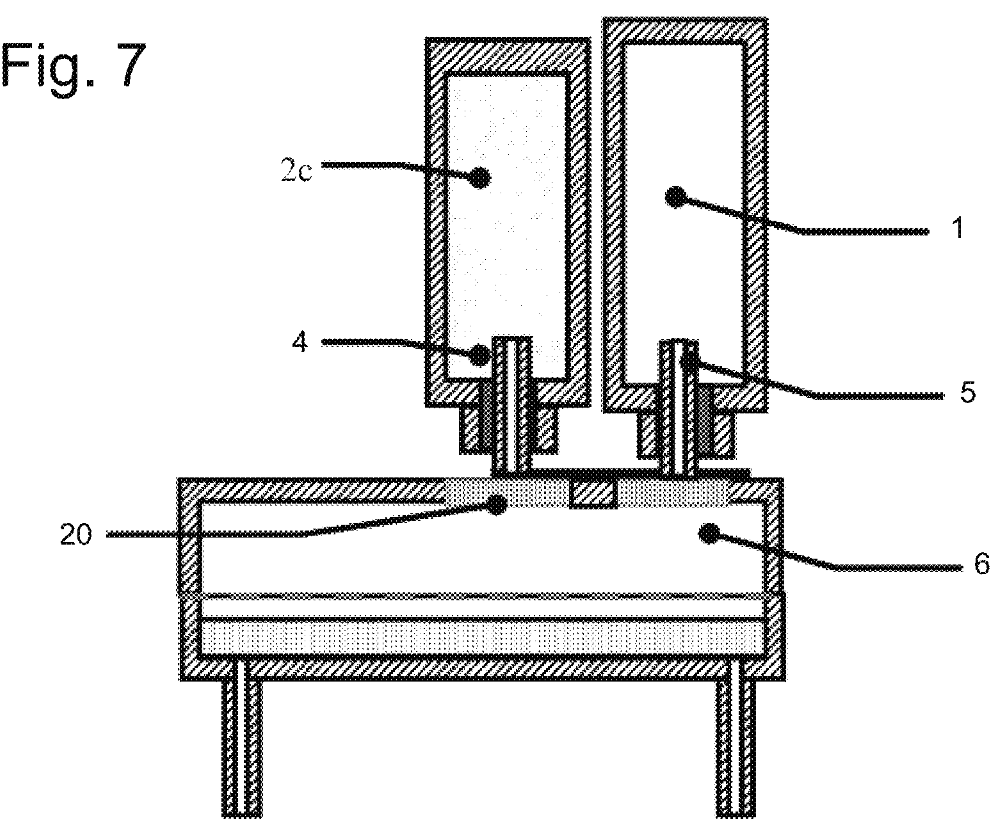
FIG. 7 shows a variation of the fluid transfer device where the chamber has an internal space upstream and downstream of a membrane.

FIG. 7 shows a variation of the fluid transfer device of FIG. 6 where the chamber has an internal space upstream and downstream of a membrane and a sterile filter barrier 20 sealing the inlet and/or the outlet of the chamber. The chamber is shown as an integral part in FIGS. 6 and 7. It can, however, be formed by two chambers combined together or connectable to each other wherein each chamber has one open side. The open side of one of the chambers can be closed by a flexible material like a film or a porous membrane. The other chamber can be combined with the first chamber at the open side such that the internal space is separated from the internal space of the first chamber with the porous membrane interposed as a permeable interface. The other or second chamber can have at least one further inlet and/or outlet to the internal space. Combining two such chambers can produce the device as shown in FIGS. 6 and 7 and allow access to the membrane before or after the fluid transfer is carried out as described above.

Figure 8:
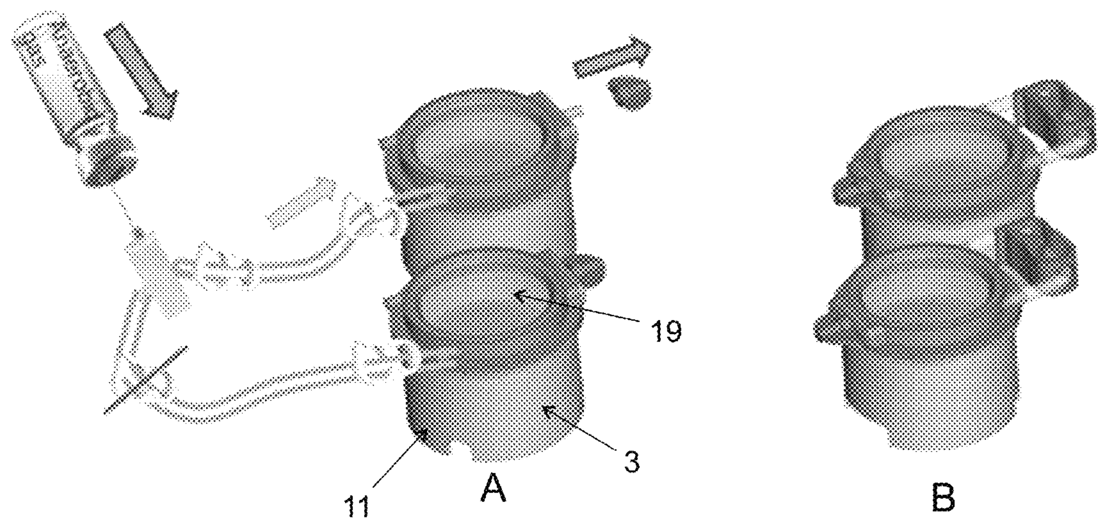
FIG. 8 shows another modification of the fluid transfer device similar to the one of FIG. 6 and adapted for the use in combination with an adapter in the typical steps of a fluid transfer of an anaerobic gas and a liquid.
Figure 8:
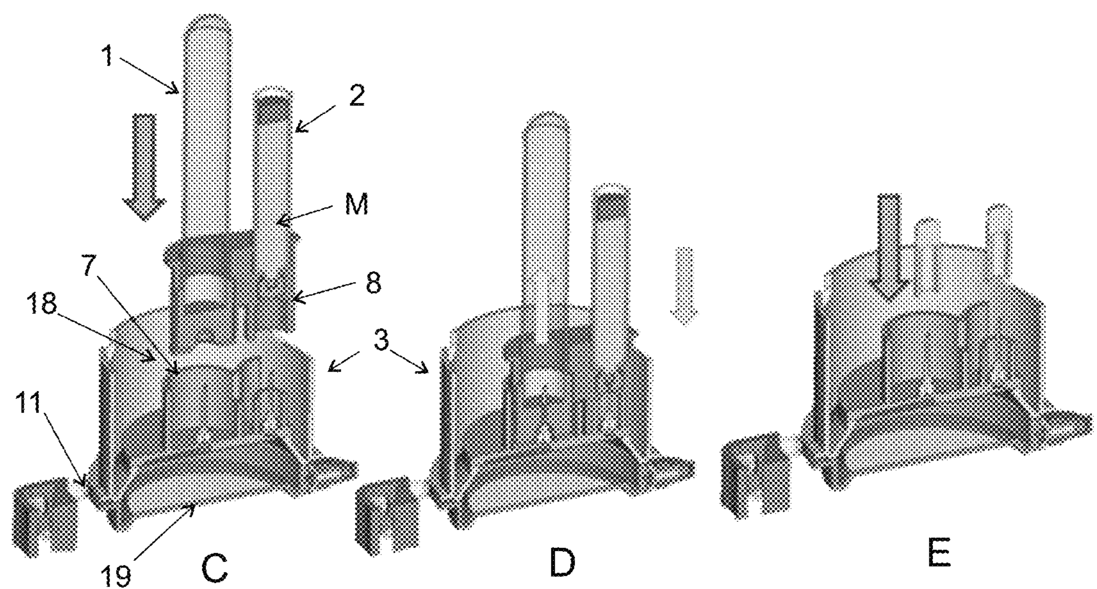

FIG. 8 shows a preferred embodiment of a fluid transfer device and its use in an aseptic transfer process. The fluid transfer device of this embodiment is, in principle, similar to the device shown in FIGS. 2 and 3 but has additional inlet and outlet connectable to external tubing and closable by plugs after use. In addition, the receptacle 7 adapted to removably receive the adapter 8 connecting the first and second reservoirs (e.g. the reservoir with the sub-ambient pressure and the reservoir with the fluid intended to be transferred into the internal space of the chamber) is surrounded by a peripheral wall 18 designed such that the chambers can be stacked or tilted upside down. The internal space of the chamber is closed by a cover 19 that may be removable. The cover 19 has a transparent window to allow visual inspection of the internal space. The chamber also has a further inlet 11 and outlet allowing the transfer of fluids, and in this example of an anaerobic gas into the internal space (see FIG. 8A). Once the anaerobic gas is transferred, the connection with the separate inlet is disconnected and closed. The outlet is closed by a plug as well. Then, as shown in FIG. 8C, the chamber is turned upside down so that the receptacle 7 for the adapter 8 of the first and second reservoirs is accessible from above. The adapter is inserted to establish the connection between the reservoirs and the internal space of the chamber to purge the fluids from the internal space into the first reservoir and to transfer the fluid M from the second reservoir into the internal space. After the adapter is removed, the inlet and outlet for the reservoirs to the internal space are plugged as well. The chamber 3 is then further processed as desired.

Although the application of the fluid transfer device has been described above in connection with gases and liquids, it may also be used in connection with viscous liquids. The type of media transferred into the internal space of the chamber from the second reservoir can be selected depending on the need.

All elements of the fluid transfer device can be disposable and designed for one-time use. Alternatively, the chamber and/or adapter can be designed for frequent use and cleaned or sterilized.

The invention claimed is:

1. A fluid transfer device comprising a first reservoir (1) having a predetermined sub-ambient pressure and volume and a presealed opening (1*a*), a second reservoir (2) containing a predetermined volume of a fluid (M) and having a presealed opening (2*a*), a chamber (3) having an internal space (6) and an inlet (4) to the space (6) configured to be connected to the opening (2*a*) of the second reservoir (2) and an outlet (5) from the space (6) configured to be connected to the opening (1*a*) of the first reservoir (1), wherein the first and second reservoirs (1,2) are connected to each other such that the respective openings (1*a*,2*a*) are oriented to be simultaneously connectable to the inlet (4) and outlet (5) of the chamber (3), and wherein the first and second reservoirs (1,2) are arranged such that, upon connection with the inlet (4) and outlet (6) of the chamber (3), the opening (1*a*) of the first reservoir (1) is opened before the opening (2*a*) of the second reservoir (2) is opened.

2. The fluid transfer device according to claim 1, wherein a volume of the fluid (M) contained in the second reservoir (2) is predetermined such that it is larger than the volume of the internal space (6) of the chamber (3).

3. The fluid transfer device according to claim 1, wherein the second reservoir (2) is deformable under ambient pressure when pressure in an internal volume of the second reservoir (2) is at a sub-ambient pressure.

4. The fluid transfer device according to claim 1, wherein the second reservoir (2) is rigid and contains a piston configured to move under ambient pressure when pressure in an internal volume of the second reservoir (2) is at a sub-ambient pressure.

5. The fluid transfer device according to claim 1, wherein the second reservoir (2) is rigid at ambient pressure and when pressurized.

6. The fluid transfer device according to claim 1, wherein the first and second reservoirs (1,2) are releasably connected to each other by an adapter (9).

7. The fluid transfer device according to claim 1, wherein the presealed openings (1*a*,2*a*) of the first and second reservoirs (1,2) are configured to be forcibly opened upon connection with the inlet (4) and outlet (5) of the chamber (3).

8. The fluid transfer device according to claim 7, wherein needle-like extensions (23 and 24) of the chamber (3) are removable.

9. The fluid transfer device according to claim 8, wherein seals (1*b*,2*b*) of the openings (1*a*,2*a*) of the first and second reservoirs (1,2) have a self-resealing property.

10. The fluid transfer device according to claim 1, wherein the internal space (6) of the chamber (3) includes one or more corrugated channel(s) (10) or a plurality of channels arranged for a simultaneous flow and connected to an inlet header and an outlet header, respectively, communicating with the inlet (4) and the outlet (5) of the chamber (3).

11. The fluid transfer device according to claim 10, wherein the plural channels of the internal space are of substantially equal length or are designed for substantially equal throughput volume.

12. The fluid transfer device according to claim 10, wherein said one or more corrugated channel(s) (10) or a plurality of channels is/are arranged so as to substantially cover an internal surface of the chamber (3).

13. The fluid transfer device according to claim 1, wherein the inlet (4) and outlet (5) of the chamber (3) are sealed by a sterile filter barrier or a piercable opening.

14. The fluid transfer device according to claim 1, wherein the chamber (3) is partially rigid having at least one wall formed from a flexible material.

15. The fluid transfer device according to claim 14, wherein the flexible material is a porous membrane.

16. The fluid transfer device according to claim 15, further comprising a second chamber integrated with the chamber (3) or sealingly connectable to the chamber (3) such that its internal space is separated from an internal volume of the chamber (3) with the porous membrane interposed as a permeable interface, wherein the second chamber has at least one further inlet and/or outlet to the internal space.

17. A process of aseptically transferring a fluid comprising:

providing a fluid transfer device as defined by claim 1;

connecting the first reservoir (1) to the outlet (5) of the chamber (3) and opening the presealed opening (1*a*) to extract a part of any fluid contained in the internal space (6) of the chamber (3) into the first reservoir (1) by means of the sub-ambient pressure in the first reservoir (1);

connecting the second reservoir (2) to the inlet (4) of the chamber (3) and opening the presealed opening (2*a*) to extract at least a part of the fluid (M) contained in the second reservoir (2) into the internal space (6) of the chamber (3) by means of the sub-ambient pressure in the first reservoir (1);

disconnecting the first and second reservoirs (1,2) from the chamber (3).

18. The fluid transfer device of claim 7 wherein seals (1*b*,2*b*) are pierced by needle-like extensions (23 and 24) of the chamber (3).

* * * * *